United States Patent [19]

Nikaido et al.

[11] Patent Number: 4,590,529

[45] Date of Patent: May 20, 1986

[54] CARRIAGE DEVICE FOR MOVING AND POSITIONING MAGNETIC HEAD

[75] Inventors: Akira Nikaido, Tokyo; Takayasu Machida; Yasuhisa Hirosawa, both of Saitama; Fumio Nakajima, Tokyo, all of Japan

[73] Assignee: Citizen Watch Co., Ltd., Tokyo, Japan

[21] Appl. No.: 587,272

[22] Filed: Mar. 7, 1984

[30] Foreign Application Priority Data

Mar. 8, 1983 [JP] Japan .................................. 58-36662

[51] Int. Cl.$^4$ ...................... G11B 21/08; H02K 41/00
[52] U.S. Cl. ...................................... 360/106; 310/13; 310/14
[58] Field of Search ...................... 360/106; 310/13, 14

[56] References Cited

U.S. PATENT DOCUMENTS

| | | | |
|---|---|---|---|
| 4,415,941 | 11/1983 | Gibeau et al. | 360/106 |
| 4,427,905 | 1/1984 | Sutton | 360/106 |
| 4,456,934 | 6/1984 | Wedman et al. | 360/106 |
| 4,506,307 | 3/1985 | Watrous | 360/106 |

*Primary Examiner*—Robert S. Tupper
*Attorney, Agent, or Firm*—Koda and Androlia

[57] ABSTRACT

A carriage device used for moving and positioning a magnetic head opposite prescribed tracks of a magnetic disk has the magnetic head mounted on a carriage which has linear motor mechanisms built integrally therein. The linear motor mechanisms incorporate coils secured to part of the carriage and permanent magnets secured aorund the coils. Guide rails serving to support the carriage within the range of the sliding motion of the coils are made of a magnetic substance.

3 Claims, 3 Drawing Figures

CARRIAGE DEVICE FOR MOVING AND POSITIONING MAGNETIC HEAD

BACKGROUND OF THE INVENTION

1. Field of the Invention

This invention relates to a carriage device for moving and positioning a magnetic head, and more particularly to an improved magnetic head carriage device for moving a magnetic head to a prescribed position on a magnetic disk or other recording/reproducing medium and causing the magnetic head to effect the required writing/reading operation at that position.

2. Description of the Prior Art

The magnetic disk drive is well known as a magnetic memory device. Because the magnetic disk drive is capable of storing prescribed alphanumerics etc. in the form of magnetic signals in the magnetic layer on a magnetic disk, it is utilized as an internal memory for the computer. Further because it is capable of storing picture images in a magnetic disk, it can be used as a memory unit in a magnetic camera.

In the past, hard disks were used with magnetic disk drives of this kind. In recent years, floppy disks have gained wide acceptance since they permit miniaturization of the disk drives and make the disk drives easier to operate. These floppy disks even make it possible to provide portable disk drives.

The magnetic disk drive of any of the types described above is generally constructed so that while the magnetic disk is rotated a magnetic head is moved in the radial direction of the magnetic disk and to a prescribed position and, at that position, is allowed to write/read information in a prescribed format in/from a specific track on the surface of the magnetic disk. For the magnetic head to be accurately reciprocated relative to the magnetic disk, the magnetic head is mounted on a carriage. The accuracy with which the magnetic head is positioned at the prescribed position is required to be extremely high. In this sense, the drive mechanism for the carriage is an extremely important factor in determining the characteristics of the device.

As means for driving the carriage, there have been reduced to practice a drive device which transmits the rotation of a stepping motor as with an α-belt to the carriage and a device which effects precise driving by mechanically combining the carriage with the moving member of a linear motor secured on the base of the device.

The conventional devices based on these operating principles require a carriage supported slidably on the base of the device and a stepping motor or a linear motor disposed independently of the carriage and, consequently, are difficult to miniaturize as a whole. Thus, they have not been able to respond to recent growing demand for further reduction of the volume, thickness and weight of disk drives.

SUMMARY OF THE INVENTION

An object of this invention is to provide an improved carriage device which enables a magnetic head to be accurately moved and accurately positioned at a prescribed track position and retained stably at that position and which permits reduction in size and weight.

To accomplish the object described above, this invention provides a magnetic head carriage device which comprises a carriage having a magnetic head mounted thereon and linear motor mechanisms integrally built in part of the carriage and, consequently, permits a marked reduction in the size of the device as a whole.

The aforementioned carriage itself is supported slidably on a pair of parallelly arranged guide rails. Two sliding members are adapted to incorporate therein the linear motor mechanisms. Each linear motor mechanism incorporates a coil secured to the carriage and two permanent magnets opposed across a gap to the outer sides of the coil and the aforementioned guide rails are formed of a magnetic substance. In this arrangement, the permanent magnets generate magnetic lines of force which pass through the coil into the guide rail. By controlling the electric current flowing through the coils of the two linear motor mechanisms, the carriage can be moved to a stated position.

DESCRIPTION OF PREFERRED EMBODIMENTS

Figure 1:
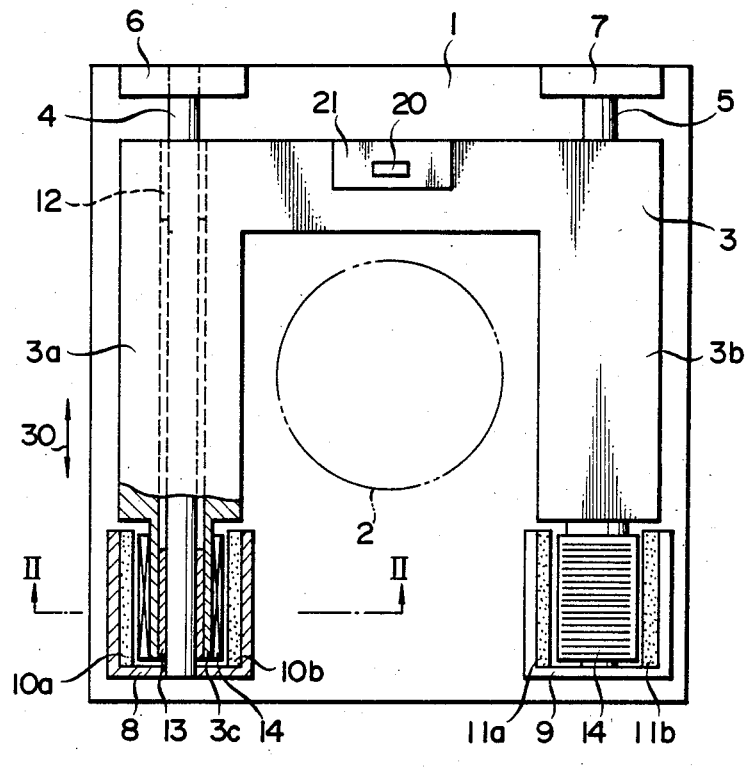
FIG. 1 is a plan view of an embodiment of the carriage device of this invention, showing a partially cutaway view of a linear motor mechanism disposed in the carriage.
Figure 2:
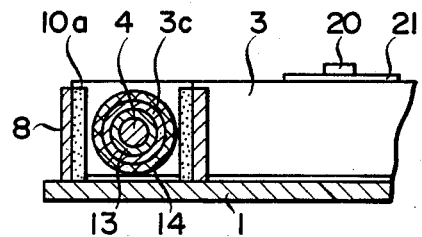
FIG. 2 is a cross-sectional view taken along line II—II in FIG. 1 to illustrate the essential part of the linear motor mechanism.

Now, a preferred embodiment of this invention will be described below with reference to the accompanying drawings. The embodiment illustrated in FIG. 1 and FIG. 2 represents a case in which this invention is applied to a magnetic disk drive, particularly to a floppy disk drive. A base plate 1 is made of a non-magnetic substance such as, for example, aluminum. On this base plate 1 is disposed a spindle motor 2. A floppy disk (not shown) is rotated as mounted on the spindle motor 2.

A carriage 3 is disposed in a state allowed to reciprocate relative to the spindle motor 2 in the directions indicated by the arrow 30. To this carriage is secured a magnetic head plate 21. On this plate 21 is mounted a magnetic head 20 of a well-known type. The reciprocating action of the carriage 3 in the directions of the arrow 30, therefore, causes the magnetic head 20 to be reciprocated in the radial direction of the magnetic disk secured to the spindle 2. Consequently, the magnetic head 20 is accurately positioned relative to a desired track on the magnetic disk and retained at that position.

To guide the aforementioned reciprocating action of the carriage 3, a pair of guide rails 4, 5 are disposed parallelly to each other on the base plate 1. Since the present invention contemplates having these guide rails 4, 5 form part of a linear motor mechanism as will be described afterward, these guide rails are formed at least partly of a magnetic substance.

The aforementioned two guide rails 4, 5 are supported each at one end by rectangular guide rail supports 6, 7 secured to the base plate 1 and pivotally supported each at the other end by yokes 8, 9 secured similarly to the base plate 1. These yokes 8, 9 are formed of magnetic members each substantially in the shape of the letter U. Through the medium of bearing holes formed one each at the portions corresponding to the bottom sides of the U's, the yokes hold the aforementioned guide rails 4, 5 in place.

In the arrangement described above, the carriage 3 which itself is in the shape of the letter U has guide members 3a, 3b which extend along two opposite wings of the U-shape and are allowed to slide on the corresponding guide rails 4, 5. By this arrangement, the carriage 3 is accurately positioned and retained relative to the base plate 1. The carriage 3 has its wings supported on the guide rails 4, 5 through the medium of bearings 12, 13.

This invention is characterized by the fact that the aforementioned carriage has a linear motor built therein. In the present embodiment, two identically constructed linear motors are built one each at one end of each of the guide members 3a, 3b. Now, the linear motor mechanism incorporated on the guide member 3a side will be described. The lower end of the guide member 3a (as seen in FIG. 1) has a smaller diameter than the remaining part of the guide member 3a. A coil 14 is wound around this small-diameter part 3c. To the opposite inner wall surfaces of the yoke 8 which are opposed to the coil 14, there are attached permanent magnets 10a, 10b (permanent magnets 11a, 11b in the other yoke 9). The pair of permanent magnets 10a, 10b (11a, 11b) are magnetized so that the poles of like signs are opposed to each other. A slight gap is provided between each of the two permanent magnets 11a, 11b and the coil 14. Thus, the coil 14 is allowed to slide without coming into contact with the two permanent magnets 10a, 10b. As is readily understood, the coil 14 is moved within the magnetic field which is formed between the two permanent magnets 10a, 10b and the guide rail 4 of a magnetic substance.

Figure 3:
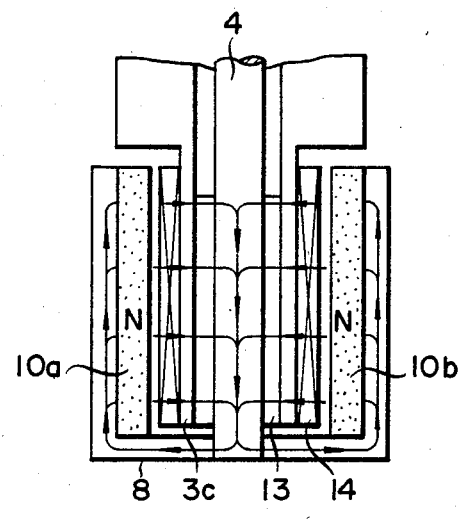
FIG. 3 is an explanatory diagram illustrating the magnetic circuit in the linear motor mechanism of the same embodiment.

FIG. 3 illustrates the magnetic circuit of the linear motor mechanism in the present embodiment. In the diagram, only the magnetic circuit formed on the guide member 3a side of the carriage 3 is illustrated. Exactly the same magnetic circuit is formed on the other guide member 3b side.

As described above, the pair of permanent magnets 10a, 10b have their poles of like sign, e.g. their N poles, opposed to each other. As a result, the path of the magnetic lines of force passes through the permanent magnets 10a, 10b and the small-diameter part 3c of the carriage 3 and reaches the guide rail 4. Then, the path of the magnetic lines is directed forward through the yoke 8 and branched into the permanent magnets to close the two loops.

As will be understood, therefore, the coil 14 is allowed to move within this substantially uniform parallel magnetic field perpendicularly to the magnetic lines of force.

Of course, the opposed north poles of the permanent magnets 10a, 10b may be changed to the south poles. In that case, the direction of the magnetic lines of force is opposite from that illustrated in FIG. 3.

In the present embodiment, the linear motor mechanism is composed of the coil 14 secured to the carriage 3, the permanent magnets 10a, 10b (11a, 11b) secured on the base plate 1 side, and the guide rail 4 (5). Now, the operation in which the carriage 3 is moved by this linear motor mechanism to a stated position will be described.

When the well-known carriage drive signal is fed to the device from a host drive circuit (not shown) or from a magnetic disk track sensor, a fixed DC signal is applied to the coil 14. Consequently, driving force generated in the axial direction of the guide rail 4 acts upon the coil 14 within the magnetic circuit shown in FIG. 3 in accordance with Fleming's rule. Depending on the direction of the DC current flowing at this time through the coil 14, the carriage 3 is moved as guided by the guide rails 4, 5 in the normal or reverse direction indicated by the arrow 30 of FIG. 1. By controlling the direction of the electric current supplied to the coil and the duration of the supply of this electric current, therefore, the carriage 3 can be moved and positioned opposite any desired track of the magnetic disk.

In the embodiment illustrated, linear motor mechanisms are provided one each for the guide members 3a, 3b formed in the opposite wings of the carriage 3, and these linear motors cooperate to impart a driving motion stably to the carriage. However, this invention does not prescribe the locations of the linear motor mechanisms built in the carriage 3. Instead of the two linear motor mechanisms in the present embodiment, a single linear motor mechanism may be utilized to drive the carriage.

In accordance with this invention, the carriage and the linear motor mechanisms are integrated with each other by having the linear motor mechanisms built in the carriage as described above. Thus, this invention permits reduction of the device both in size and weight. The propelling force of the linear motors can be increased enough to drive the carriage by increasing the magnetic flux density of the permanent magnets. Particularly the fact that the guide rails are formed so as to constitute part of the magnetic circuit of the permanent magnets contributes to miniaturizing the device and providing an efficient driving motion.

The miniature carriage device contemplated by the present invention is particularly suitable for use in a miniature magnetic disk drive. It is also usable in a low-power consumption type magnetic disk drive or magnetic camera device which operates on dry cells. It is further useful as a memory device in a portable computer system.

We claim:

1. A carriage device for moving and positioning a magnetic head opposite a prescribed track of a magnetic disk, comprising guide rails formed at least partly of a magnetic substance and secured to a base plate, a carriage having mounted thereon a magnetic head and being slidably supported on said guide rails, coils forming part of said carriage and disposed around the portions of the guide rails made of a magnetic substance, magnetic yokes magnetically linked with said magnetic portions of the guide rail and secured to said base plate, and permanent magnets secured to said magnetic yokes and opposed across a gap to said coils.

2. A carriage device according to claim 1, wherein said permanent magnets are a pair of permanent magnets disposed one on either side of said coils with the poles of like sign opposed to each other.

3. A carriage device according to claim 1, wherein said guide rails are a pair of guide rails of a magnetic substance disposed parallelly to each other and secured on said base plate.

* * * * *